(12) United States Patent
Thiel et al.

(10) Patent No.: US 12,304,421 B2
(45) Date of Patent: May 20, 2025

(54) GLAD HAND LOCK HANGER AND METHODS OF USE

(71) Applicants: Robert M. Thiel, Marietta, GA (US); David L. McKenzie, Alpharetta, GA (US)

(72) Inventors: Robert M. Thiel, Marietta, GA (US); David L. McKenzie, Alpharetta, GA (US)

(*) Notice: Subject to any disclaimer, the term of this patent is extended or adjusted under 35 U.S.C. 154(b) by 492 days.

(21) Appl. No.: 17/580,570

(22) Filed: Jan. 20, 2022

(65) Prior Publication Data
US 2022/0243479 A1    Aug. 4, 2022

Related U.S. Application Data

(60) Provisional application No. 63/143,798, filed on Jan. 30, 2021.

(51) Int. Cl.
*B60R 25/08*    (2006.01)

(52) U.S. Cl.
CPC .................... *B60R 25/08* (2013.01)

(58) Field of Classification Search
CPC ...... E04F 13/0846; E05B 67/02; E05B 67/38; E05B 67/383; E05B 2067/386; E05B 79/02; E05B 79/04; E05B 83/02; E05B 83/08; E05B 83/10; E05B 83/12
See application file for complete search history.

(56) References Cited

U.S. PATENT DOCUMENTS

| | | | |
|---|---|---|---|
| 1,136,582 A * | 4/1915 | Birdsong | E05B 67/38 70/56 |
| 1,899,445 A | 2/1933 | Gustave | |
| 2,242,201 A | 5/1941 | Woods | |
| 3,874,265 A | 4/1975 | Kruzell | |
| 4,226,103 A * | 10/1980 | Strickland | B60T 17/043 70/237 |
| 4,387,872 A | 6/1983 | Hogue | |
| 4,624,372 A | 11/1986 | Brolin | |
| 5,271,174 A | 12/1993 | Bentley | |
| 5,287,972 A | 2/1994 | Saathoff | |

(Continued)

FOREIGN PATENT DOCUMENTS

| | | |
|---|---|---|
| JP | H0390488 A | 4/1991 |
| JP | 2008307358 A | 12/2008 |
| WO | 2020208640 A1 | 10/2020 |

*Primary Examiner* — Kristina R Fulton
*Assistant Examiner* — Noah Horowitz
(74) *Attorney, Agent, or Firm* — Device Patent LLC (57) ABSTRACT

Disclosed herein are specialized brackets for anchoring locking devices such as a glad hand lock and methods thereof. Glad hand locks lock out air brake service lines on tractor trailers preventing undesired movement of the trailer. The glad hand lock is removed when the trailer is to be moved but they frequently are misplaced or inconveniently stored resulting in wasted time and money retrieving the glad hand lock. The brackets herein provide a quick, secure, and protected option for storage of the glad hand locks at convenient locations near loading docks or trailer parking sites. The brackets comprise a back plate and a front plate spaced by a spacer arm which define a lock gap. The front plate has a top end configured for sliding fit into a lock slot of a glad hand lock. A plunger bar on the glad hand lock is deployed activating a storage configuration.

19 Claims, 7 Drawing Sheets

(56) References Cited

U.S. PATENT DOCUMENTS

| | | | |
|---|---|---|---|
| 5,325,686 A | 7/1994 | Bentley | |
| 5,385,039 A | 1/1995 | Feldpausch et al. | |
| 5,410,894 A * | 5/1995 | Fox | B60R 25/08 |
| | | | 70/237 |
| 5,588,631 A | 12/1996 | Yee | |
| 5,694,668 A | 12/1997 | Rohlf | |
| 5,988,569 A * | 11/1999 | Zhang | B60D 1/62 |
| | | | 248/65 |
| 6,439,008 B1 * | 8/2002 | Keil | B60D 1/60 |
| | | | 70/56 |
| 6,557,808 B1 * | 5/2003 | Ling | E05B 67/38 |
| | | | 403/325 |
| 6,634,681 B1 | 10/2003 | Redden | |
| 6,871,437 B1 | 3/2005 | Bartozzi et al. | |
| 7,311,233 B2 * | 12/2007 | Chen | B62J 11/00 |
| | | | 224/935 |
| 8,052,172 B1 * | 11/2011 | Junior | B61G 5/08 |
| | | | 292/195 |
| 8,083,112 B2 * | 12/2011 | Kuo | B62J 11/00 |
| | | | 224/547 |
| 8,347,762 B2 * | 1/2013 | Jones | B25B 13/48 |
| | | | 81/177.2 |
| 10,053,891 B1 | 8/2018 | Williams et al. | |
| 10,760,306 B2 * | 9/2020 | Chapman | E05B 67/38 |
| 10,995,522 B2 * | 5/2021 | Derman | E05B 67/38 |
| 11,099,560 B2 * | 8/2021 | Smith | B62D 13/06 |
| 2003/0102273 A1 | 6/2003 | McMurray | |
| 2005/0199628 A1 * | 9/2005 | Van Handel | A47G 29/10 |
| | | | 220/315 |
| 2006/0117634 A1 | 6/2006 | Keller et al. | |
| 2008/0231067 A1 | 9/2008 | Nagle | |
| 2011/0198474 A1 | 8/2011 | Karst | |

* cited by examiner

GLAD HAND LOCK HANGER AND METHODS OF USE

CROSS REFERENCE TO RELATED APPLICATIONS

This application claims priority to Provisional Patent Application No. 63/143,798 filed Jan. 30, 2021, the entire disclosure of which is hereby incorporated by reference and relied upon.

BACKGROUND OF THE INVENTION

Field of the Invention

The invention relates generally to anchor brackets, and more particularly to anchor brackets for holding locking devices.

Doors on an enclosed trailer can be secured by locks as a deterrent to unauthorized removal of goods from the trailer. Locks on the trailer doors do not however, prevent the entire trailer and its contents from being stolen. Unauthorized trailer removal is simply a matter of connecting the trailer to a capable vehicle and driving away. Larger trailers such as tractor-trailers typically have air brakes. Control of these brakes come from the tractor side of a tractor trailer known as a supply lines which are coupled to the trailer side air brake lines known as the service line. The couplers that join the service lines and supply lines are known as glad hands. The glad hands have a snap-lock position and a rubber seal that prevents air from escaping from the lines when coupled to the service lines and supply lines. When the trailer is parked, the glad hands are de-coupled, and the trailer is released from the tractor leaving the trailer parked and the freedom for the tractor to move on and perform work associated with other trailers. As a means to prevent trailer theft, it is common to place a glad hand lock over the service line glad hand of the trailer. The glad hand lock typically has a keyed lock that engages the glad hand thereby preventing removal of the glad hand lock from the glad hand on the trailer's air brake service line. This effectively prevents unauthorized use and removal of the trailer since air brakes on a trailer engage when the service line air is absent. This protects not only the trailer and its contents, but it also protects humans from unintended trailer movement that may be near or working in the trailer.

When the trailer once again is to be moved, a tractor backs up to the trailer and locks with the hitch (i.e., $5^{th}$ wheel hitch). Typically using a key, the glad hand lock is unlocked and removed from the glad hand service line and thereby no longer obstructs the coupling of the supply line and service line of the air brakes. The brake lines are coupled and the trailer is now available to be moved by the tractor.

This is the point when the glad hand lock frequently becomes lost or misplaced. The driver of the tractor may find themselves gone from the site overnight, days, weeks, or months. If the glad hand lock is placed in their tractor, the next driver who arrives with a new trailer will not have access to the glad hand lock and may therefore leave the trailer unsecured. The first driver may alternatively leave the glad hand lock with office personnel where it is placed in a desk drawer or on a closet shelf. This of course requires time to find someone responsible to leave the glad hand lock with and hopefully that individual will still be available when the next driver arrives needing the glad hand lock to secure their trailer. Consequently, transportation companies waste enormous time locating, storing, and communicating about glad hand locks. In some cases, despite the efforts by the driver and staff, the glad hand lock cannot be found and the trailers are left unsecured from theft or remain dangerous due to unintended trailer movement for those working in or around the trailer. It should be noted however, that these problems are not limited to only enclosed trailers. These issues extend to tankers, liquid tankers, ingredient truck, open top, and all type of trailers utilizing air brakes.

What is needed is a device and methods that will provide quick access to the glad hand lock and prevention of misplacement or the loss of the glad hand lock. The solution should keep the glad hand lock secured near the trailer dock so that it is always accessible and readily available for use.

SUMMARY OF THE INVENTION

In response to the needs described above, disclosed herein are various forms of glad hand lock hangers, referred herein also as a Gladhanger™ and otherwise in this document as a 'gladhanger'. Gladhangers are specialty brackets used for securing a glad hand lock (blocking locks) to an anchor in a storage mode near the dock or parking site of trailers that will benefit from their use.

In one form, a gladhanger is a one-piece device.

In one form, a gladhanger is a multi-part device.

In one form, a gladhanger comprises a back plate operable to be secured to an anchor such as a wall, a door, a post, a frame of a doorway, or other object that can serve as an anchor.

In one form, the back plate comprises a front face and a rear face.

In one form, the front face is directed to the user, whereas the rear face is directed towards the anchor.

In one form, the back plate comprises one or more mounting holes extending between the front face and rear face.

In one form, the back plate comprises one or more hinge holes extending from the rear face for securing a hinge with hinge fasteners.

In one form, one or more of the mounting holes is hidden when a glad hand lock is secured in place on the gladhanger.

In one form, a peripheral face extends between the front face and rear face forming the periphery of the back plate.

In one form, the back plate is substantially hexagonal.

In one form, the gladhanger comprises a front plate spaced frontally from the back plate.

In one form, the front plate is substantially parallel to the back plate.

In one form, the front plate comprises a frontal surface and a rear surface.

In one form, a lateral face extends at the lateral sides between the frontal surface and rear surface of the front plate.

In one form, a top end of the front plate has a size and profile for sliding fit into the lock slot of a glad hand lock.

In one form, the front plate body has a size and profile for sliding fit through the lock slot of a glad hand lock.

In one form, a spacer arm extends between the back plate and the front plate spacing the front plate from the back plate.

In one form, the back plate and the front plate are spaced sufficient for passage of a trap leg of a glad hand lock.

In one form, the spacer arm comprises upper face.

In one form, the gladhanger comprises a lower face.

In one form, the spacer arm comprises opposed side faces.

In one form, the opposed side faces are substantially parallel.

In one form, a first frontal inset is inset from one of the opposed side faces.

In one form, a second frontal inset is inset from one of the opposed side faces.

In one form, the upper face and opposed side faces are substantially perpendicular.

In one form, the spacer arm distances the front plate from the back plate thereby defining a lock gap therebetween.

In one form, the lock gap 'G' is substantially 0.5 inch.

In one form, inset into the lower face is a lock channel with lock face thereon.

In one form, the lock channel is semi-cylindrical.

In one form, the lock channel is absent from the lower face.

In one form, the lock channel opens to the frontal surface.

In one form, the lock channel is at least partially cylindrical.

In one form, a gladhanger is fastened using one or more fasteners in 0.25 inch diameter mounting holes.

In one form, at least one fastener is self-drilling.

In one form, a gladhanger comprises an optional protective shield to shield a glad hand lock supported on the gladhanger from outdoor elements.

In one form, the protective shield comprises a superior wall, a near wall, a first lateral wall, and a second lateral wall.

In one form, the superior wall comprises an inner superior face facing downward and an outer superior face facing upwards.

In one form, the near wall comprises an inner near face facing the back plate and a front facing outer near face.

In one form, the first lateral wall and the second lateral wall each comprise an inner lateral face facing the front plate and an opposed outer lateral facing away from the front plate.

In one form, the protective shield comprises an abutment face extending between the inner lateral faces and outer lateral faces that abuts the front face of the back plate when the protective shield is fully closed.

In one form, the protective shield comprises a down face facing downwards extending between the inner lateral faces and outer lateral faces.

In one form, a gladhanger comprises a shield hinge having a first leaf and a second leaf.

In one form, the first leaf is fixed to the back plate and the second leaf is fixed to the superior wall.

In one form, mounting a glad hand lock to a gladhanger comprises lifting pivoting the protective shield about the shield hinge to provide open access to the front plate.

In one form, the protective shield is prevented from fully closing unless the lock mechanism of the glad hand lock is fully engaged in a storage configuration. This serves as a reminder to the user that the glad hand lock still needs to be locked on the gladhanger.

In one form, the inner lateral faces, the inner superior face, the inner near face, and the front face of the back plate define a protection cavity within the protective shield to shield a glad hand lock from outside elements.

In one form, the protective shield is manufactured from a translucent polymer.

In one form, the shield hinge is manufactured from a translucent polymer.

In one form, the gladhanger is manufactured from a polymer, a metal, or metal alloy;

In one form, the gladhanger is mounted under a dock door pad on a loading dock which helps shield the weather elements from a glad hand lock.

Field testing of gladhangers over a 1 year period revealed remarkable results as outlined below.

1. Glad hand locks were consistently in place on gladhangers 100% of the time.
2. Glad hand locks were consistently used both on "spotted" trailers and on parked tractor trailers being loaded or unloaded 100% of the time.
3. All trailers and tractor trailers were glad hand locked without fail prior to entry.
4. Eliminated 100% of glad hand lock losses.

BRIEF DESCRIPTION OF THE SEVERAL VIEWS OF THE DRAWINGS

These and other features and advantages of the present invention will become more readily appreciated when considered in connection with the following detailed description and appended drawings, wherein each drawing is according to one or more embodiments shown and described herein, and wherein.

DETAILED DESCRIPTION OF SELECTED EMBODIMENTS OF THE INVENTION

Select embodiments of the invention will now be described with reference to the Figures. Like numerals indicate like or corresponding elements throughout the several views and wherein various embodiments are separated by letters (i.e. 100, 100B, 100C). The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

Disclosed herein are various forms of glad hand lock hangers, which again can be alternatively referred to as a gladhanger 100. The gladhanger is utilized for securing a glad hand lock 60 to an anchor 104 in a storage mode near the dock, near the parking site of trailers, or other convenient location where it will be used when needed to secure a trailer having an air braking system.

In one embodiment as illustrated in FIGS. 1-5, a gladhanger 100 is a one-piece monolithic device typically injected, casted or welded from an assembly of plates. In some forms the gladhanger is made of a polymer, a metal, or a metal alloy. The word 'leg' my be substituted herein wherever the word 'plate' is used such when describing the embodiments in FIGS. 6-9. The gladhanger can include a coating such as a powder coating. In alternative forms, the gladhanger is a multi-part device whereby individual plates are secured in an assembly form using fasteners or welds. In this case, the fastener heads are preferably accessed from a side of the gladhanger hidden from view or otherwise mounted against a wall.

Figure 1:
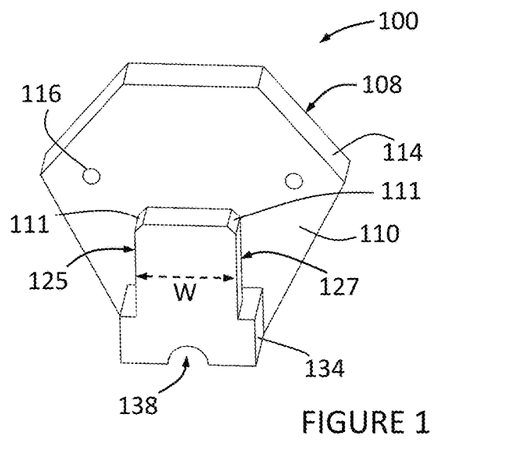
FIG. 1 depicts a top perspective view of a gladhanger.
Figure 2:
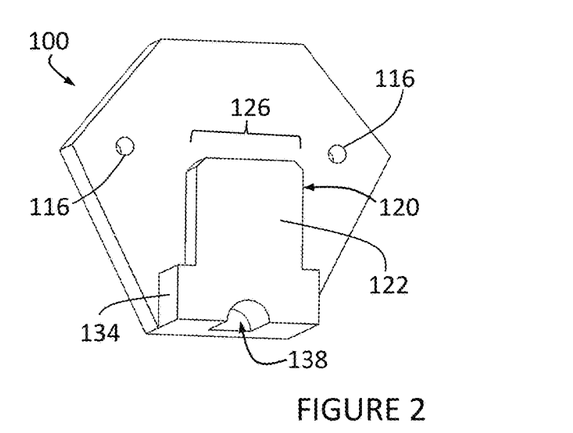
FIG. 2 depicts a bottom perspective view of the gladhanger of FIG. 1.
Figure 3:
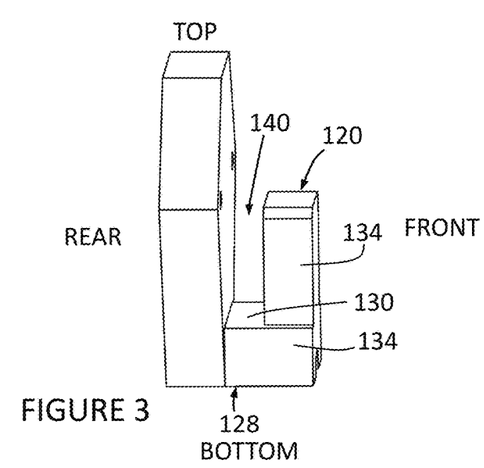
FIG. 3 depicts a side perspective view of the gladhanger of FIG. 1.
Figure 4:
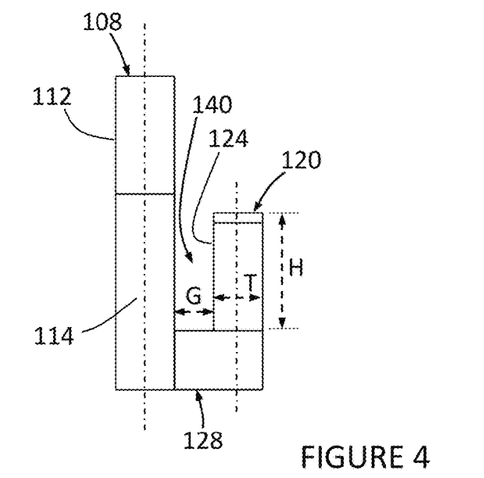
FIG. 4 depicts a side view of the gladhanger of FIG. 1.
Figure 5:
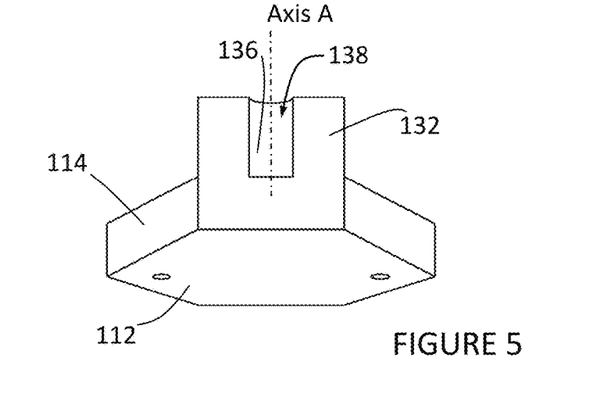
FIG. 5 depicts a bottom view of the gladhanger of FIG. 1.
Figure 6:
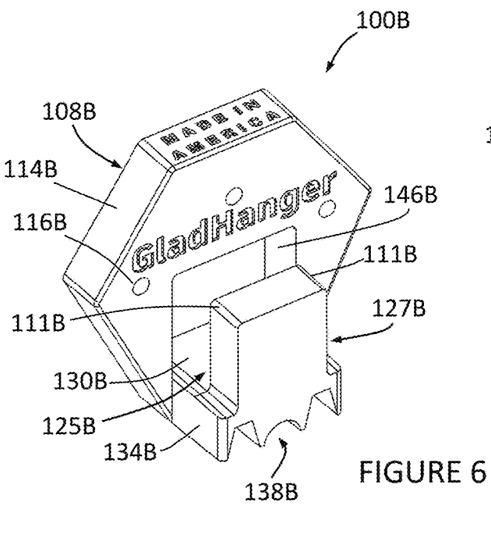
FIG. 6 depicts a top perspective view of a gladhanger.
Figure 7:
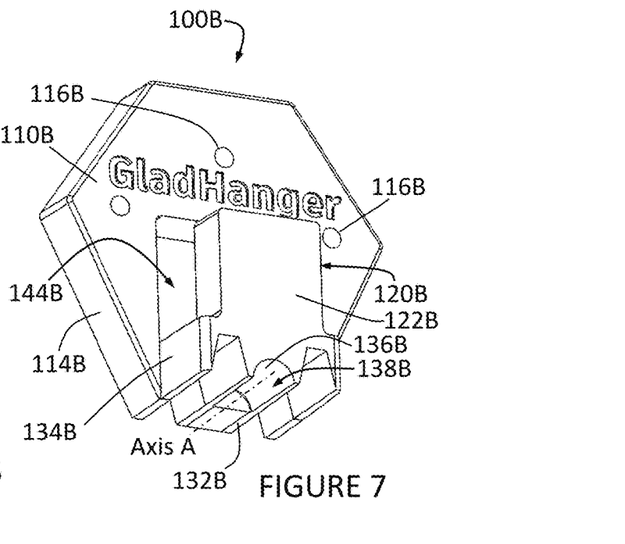
FIG. 7 depicts a bottom perspective view of the gladhanger of FIG. 6.
Figure 8:
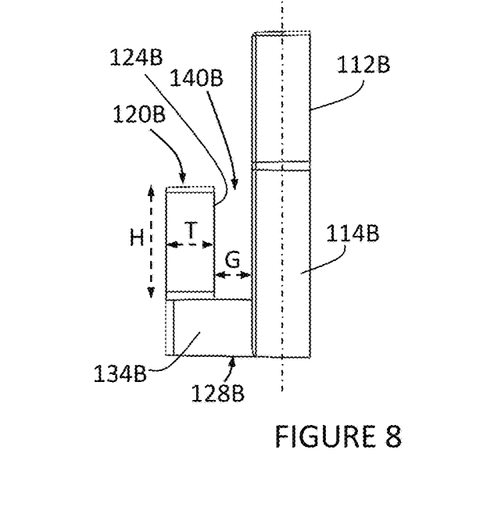
FIG. 8 depicts a side view of the gladhanger of FIG. 6.
Figure 9:
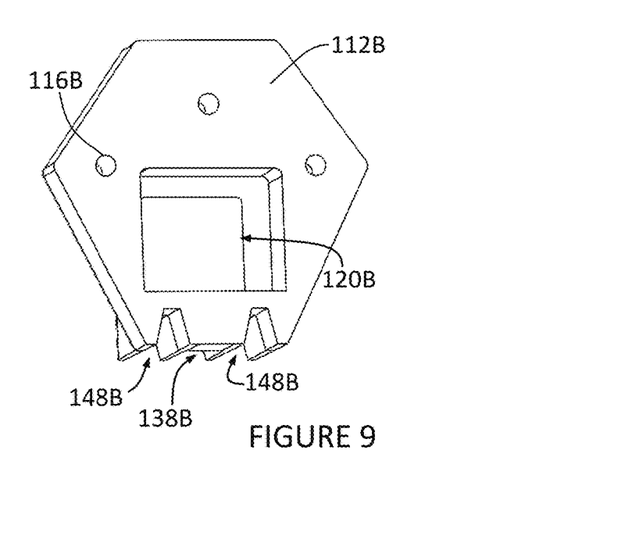
FIG. 9 depicts a rear perspective view of the gladhanger of FIG. 6.

FIG. 1 is a frontal perspective view of a gladhanger 100. This embodiment comprises a back plate 108 operable to be secured to an anchor 104 (FIG. 6) such as a wall, a door, a post, a frame of a doorway, or other suitable object. The back plate 108 comprises a front face 110 that is typically directed towards a user when the gladhanger is mounted on the anchor. Opposite the front face is a rear face 112 that typically faces the anchor. Although flat is preferable for the various gladhanger faces, they can assume other contours and not interfere with the function of the bracket. In this embodiment, the front face 110 and rear face 112 are substantially parallel to each other. In alternative embodiments for example, rear face 112 can be concave for enhanced mounting to a round post.

In preferred embodiments, the back plate 108 comprises one or more mounting holes 116 extending between the front face 110 and rear face 112. In some embodiments, one or more of the mounting holes 116 is hidden when a glad hand lock 60 is secured in place on the gladhanger thereby preventing removal of the fastener until the glad hand lock is removed. In this embodiment, the mounting holes 116 are substantially horizontally aligned, however other mounting hole placements can be utilized such as vertical so as to tie into a vertical stud supporting a wall. In some embodiments, the mounting hole can include a recess for counter sinking a fastener head. Fasteners 117 (FIGS. 15-19), such as threaded bolts having a fastener head 118 can be used to secure to an anchor 104. In some cases, nuts will be used to secure the fasteners to a non-threaded anchor. Traditional slotted heads are illustrated here, however other heads can be utilized such as those fasteners having tamper proof heads. A peripheral face 114 extends between the front face 110 and rear face 112 of the back plate 108 and in preferred forms the back plate is substantially hexagonal but can assume a variety of other shapes and forms. In alternative forms, for example, the back plate can be a substantially elongate rectangle standing vertical.

Figure 10:
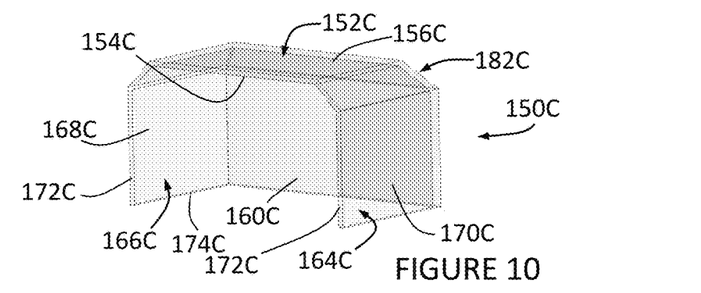
FIG. 10 depicts a perspective view of a protective shield for gladhanger.

As further illustrated in FIGS. 1-6, the gladhanger 100 comprises a front plate 120 spaced frontally from the back plate 108. In this embodiment, the front plate is substantially parallel to the back plate but in other embodiments is non-parallel. The front plate 120 comprises a frontal facing frontal surface 122 and a rear facing rear surface 124. Opposed side faces 134 extend between the frontal surface and the rear surface on the lateral sides of the front plate 120. A first frontal inset 125 and a second frontal inset 127 can be present as further steps inward from the opposed side faces. A top end 126 of the front plate 120 is formed where a lead face 123 extends between the frontal surface 122, rear surface 124, and opposed side surfaces 134. One or more edges at these intersections can be tapered 111 for eased loading of a glad hand lock on to the gladhanger. In preferred forms, top end 126 of the front plate has a size and profile for sliding fit into the lock slot 72 of a glad hand lock 60. The profile illustrated here is generally rectangular, however other profiles can be utilized. The assigned descriptions such as 'top', 'side', and 'bottom' represent a standard mounting of the gladhanger to an anchor such as illustrated in FIG. 10. It is recognized that the gladhanger can function when mounted in other orientations on an anchor such as sideways or upside down. It is also recognized that the front plate can assume a variety of other shapes and forms yet remain functional for locking a glad hand lock to it.

Figure 23:
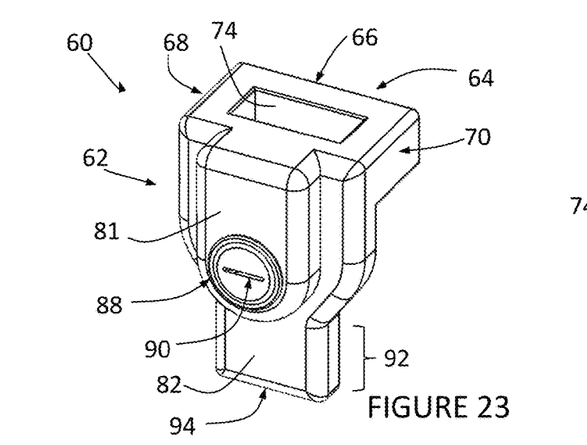
FIG. 23 depicts a top perspective view of a common glad hand lock in a locked mode.
Figure 24:
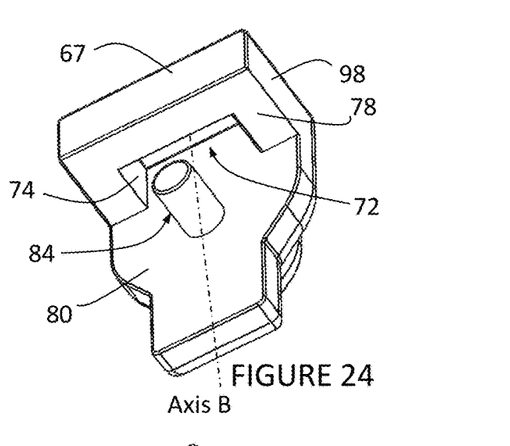
FIG. 24 depicts a bottom perspective view of the common glad hand lock of FIG. 23 in a locked mode.

A spacer arm 128 extends between the front face 110 of back plate 108 and the rear surface 124 of front plate 120 whereas the back plate and the front plate are spaced a distance 'G' sufficient for free passage of the trap leg 66 (FIG. 23) of a glad hand lock. In preferred embodiments, distance 'G' ranges from 0.375 inch to 0.625 inch but can assume other ranges.

In this embodiment, the spacer arm 128 comprises an upper face 130 facing upwards and a lower face 132 facing downwards. The spacer arm 128 also comprises laterally facing opposed side faces 134. Typically, the opposed side faces are substantially parallel to each other while the upper face 130 and opposed side faces 134 are substantially perpendicular although other orientations can be used.

Figure 18:
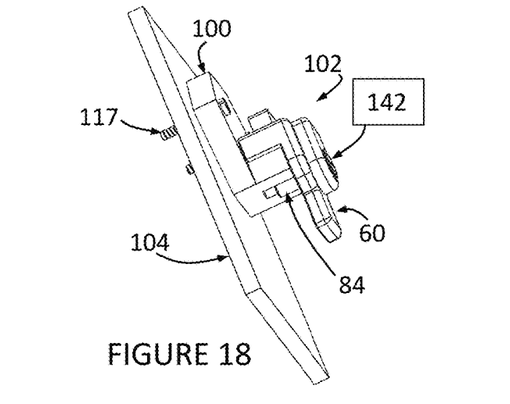
FIG. 18 depicts a bottom perspective view illustrating a step during mounting of a gladhand lock to a gladhanger.
Figure 19:
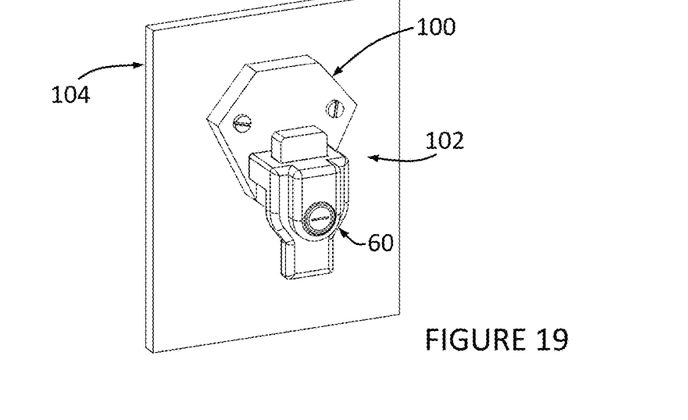
FIG. 19 depicts a front perspective view illustrating a step during mounting of a gladhand lock to a gladhanger.

In this embodiment, inset into the lower face 132 is a lock face 136 defining lock channel 138 that opens to frontal surface 122. The lock channel houses the plunger bar 84 of a glad hand lock 60 that is mated to it (FIG. 18). Lock channel 138 in preferred embodiments has a semi-cylindrical profile although in other embodiments can assume other profiles. The lock channel comprises an elongate axis 'A' which in this embodiment is substantially perpendicular to back plate 108 and whereas one end of the lock channel opens to frontal surface 122. In some embodiments the lock channel is absent whereby lower face 132 is utilized as a blocking surface when the hanger lock assembly 102 is in a storage configuration (i.e. on gladhanger with plunger bar deployed).

FIGS. 6-9 depicts a preferred embodiment of a gladhanger including many of the same features highlighted in FIGS. 1-5 as represented by the like reference numbers. In this embodiment, a logo is inset in front face 110B and in a top facing peripheral face 114B. This embodiment also includes a window face 146B extending between the front face 110B and rear face 112B of back plate 108B that defines a generally square back plate window 144B aligned behind front plate 120B. In this embodiment, the back plate window is relatively enlarged by approximately 0.25 inch on 3 sides compared to back plate 108B. This embodiment also includes a pair of parallel spaced down grooves 148B extending between the rear face 112B and frontal surface 122B. The down grooves 148B run generally parallel to and are spaced on each side of axis A. In this embodiment, the down grooves have a flattened cone shape.

Illustrated in FIGS. 10-14 is yet another embodiment of a hanger lock assembly 102C including a gladhanger 100C having an optional protective shield 150C to shield a glad hand lock 60C supported on the gladhanger 100C from outdoor elements. In this embodiment, the shield is substantially box shaped with one or more relief edges 182C. The protective shield 150C comprises a superior wall 152C, a near wall 158C, a first lateral wall 164C, and a second lateral wall 166C. The superior wall 152C comprises an inner superior face 154C facing downward and an outer superior face 156C facing upwards. The near wall 158C comprises an inner near face 160C facing the back plate and a front facing outer near face 162C. The first lateral wall 164C and the second lateral wall 166C each comprise an inner lateral face 168C facing the front plate 120C and an opposed outer lateral face 170C facing away from the front plate. An abutment face 172C extends between the inner lateral faces 168C and outer lateral faces 170C that abuts the front face 110C of the back plate when the protective shield is fully closed. A down face 174C facing downwards extends between the inner lateral faces 168C and outer lateral faces 170C.

Further noted in FIGS. 11-14 is a shield hinge 176C having a first leaf 178C and a second leaf 180C. The first leaf 178C is fixed to the back plate 108C and the second leaf 180C is fixed to the superior wall 152C. Fasteners can be used for securing the shield hinge to the protective shield as well as for securing to the back plate. Alternatively, bonding agents can be used for this purpose. In preferred forms, the protective shield is manufactured from a translucent polymer as is the shield hinge to provide a view to the gladhanger lock even when the protective shield is closed. These components can also be manufactured from metals, alloys, and a variety of polymers. The inner lateral faces, the inner superior face, the inner near face, and the front face of the back plate define a protection cavity 184C within the protective shield 150C to shield a glad hand lock 60C from outside elements.

FIG. 23-26 provide an example of a glad hand lock 60 as might be encountered in the prior art. Prior art examples include: AIRGAS-AS1KDD479, UNITED PACIFIC-UP190618, MYTEE PTORDUCT-MP-ABGHL-M, TECTRAN, VELMAC-035150, JENDYK-6300, AUTOMANN-179.1, and ZORO-5ZVP3. Glad hand lock 60 comprises a L-shaped body portion 62 whereby the shorter leg of the 'L' is referred to as the trap arm 64 and the longer leg of the 'L' is referred to as the lock arm 76. The trap arm 64 comprises a first extension leg 68 and a second extension leg 70 extending from the lock arm 76 and terminating at outer trap surface 67. A trap leg 66 extends between the first extension leg 68 and second extension leg 70 to define lock slot 72 which extends between top face 83 facing the top and first interior face 78 facing the inside of the 1' on the trap arm 64. Mate surfaces 74 define the profile of lock slot 72.

Second interior face 80 also faces the inside of the 1' and is located on lock arm 76 with exterior face 82 opposed on the opposite side of the lock arm 76. The long leg of 'L' shaped body portion 62 terminates at flange head 94 at the end of mating flange 92. The mating flange 92 is bounded on two sides by flange sides 96 which expand to first lateral side 98 and opposed second lateral side 97.

Figure 25:
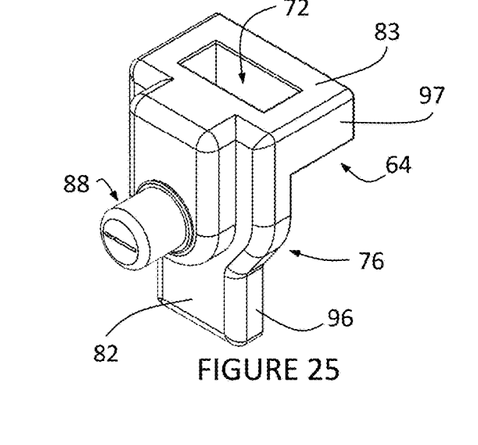
FIG. 25 depicts a top perspective view of the common glad hand lock of FIG. 23 in an unlocked mode.
Figure 26:
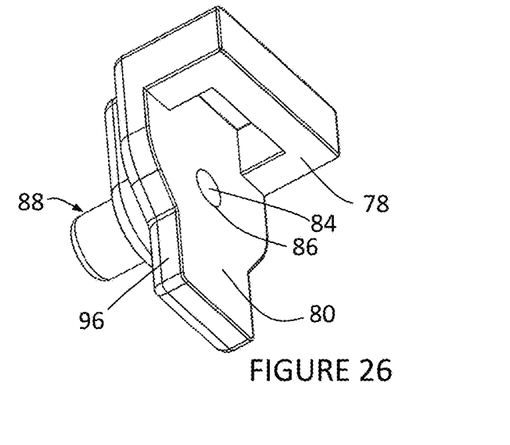
FIG. 26 depicts a bottom perspective view of the common glad hand lock of FIG. 23 in an unlocked mode.

Extending through the body portion 62 between second exterior face 81 (if present) and exterior face 82 to second interior face 80 is plunger aperture 86 operable for housing with sliding fit plunger bar 84. Controlled by a key operable in key slot 90, of lock mechanism 88, plunger bar 84 extends beyond second interior face 80 in a storage configuration (FIGS. 23-24) and retracts into plunger aperture 86 in a released configuration (FIGS. 25-26).

Figure 21:
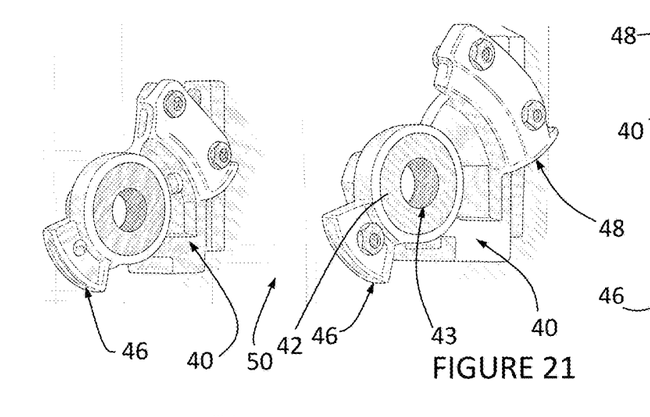
FIG. 21 depicts a perspective view of a common form of a glad hand on a trailer.
Figure 22:
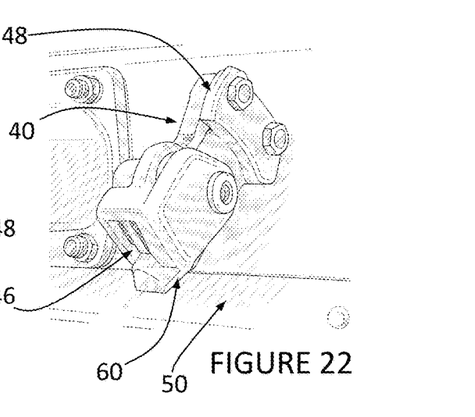
FIG. 22 depicts a perspective view of a common glad hand with a glad hand lock locked on the glad hand.

FIG. 21 illustrates a glad hand service line 40 as might be commonly found on the front of a semi-trailer 50 for control of the trailer's air braking system. An air port 43 in the glad hand service line 40 provides for the transfer of compressed air utilizing seal 42 to minimize leakage. Service line mating flange 46 and flange head coupler 48 are utilized to couple with a truck's air brake supply lines. When the air brake supply lines are removed, a glad hand lock 60 is coupled with the glad hand service line 40 by capturing mating flange 92 in flange head coupler 48 and capturing service line mating flange 46 in lock slot 72. At this point plunger bar 84 is deployed thereby preventing removal of the glad hand lock 60.

Figure 15:
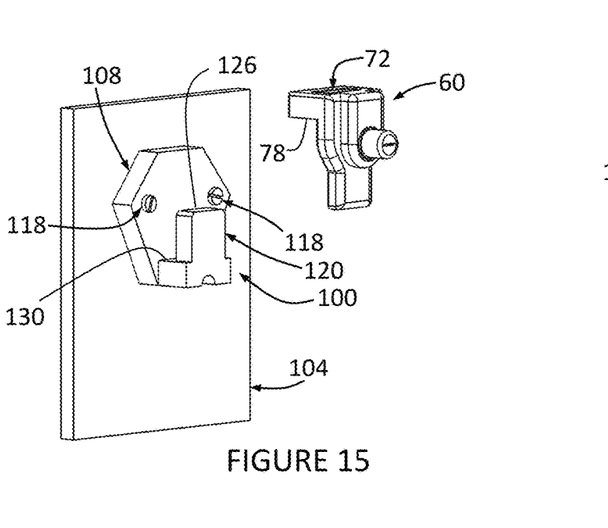
FIG. 15 depicts a front perspective view illustrating a step during mounting of a gladhand lock to a gladhanger.
Figure 16:
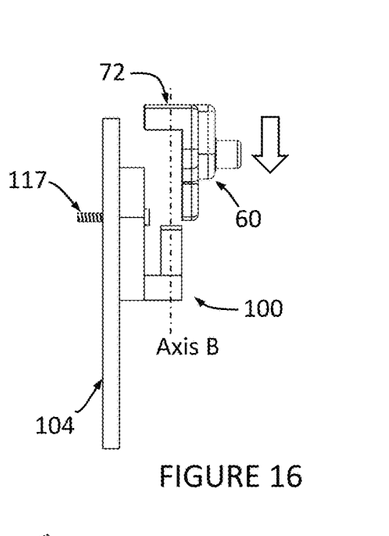
FIG. 16 depicts a side view illustrating a step during mounting of a gladhand lock to a gladhanger.
Figure 17:
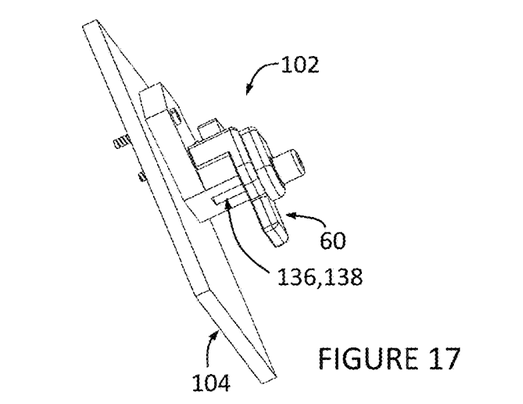
FIG. 17 depicts a bottom perspective view illustrating a step during mounting of a gladhand lock to a gladhanger.
Figure 20:
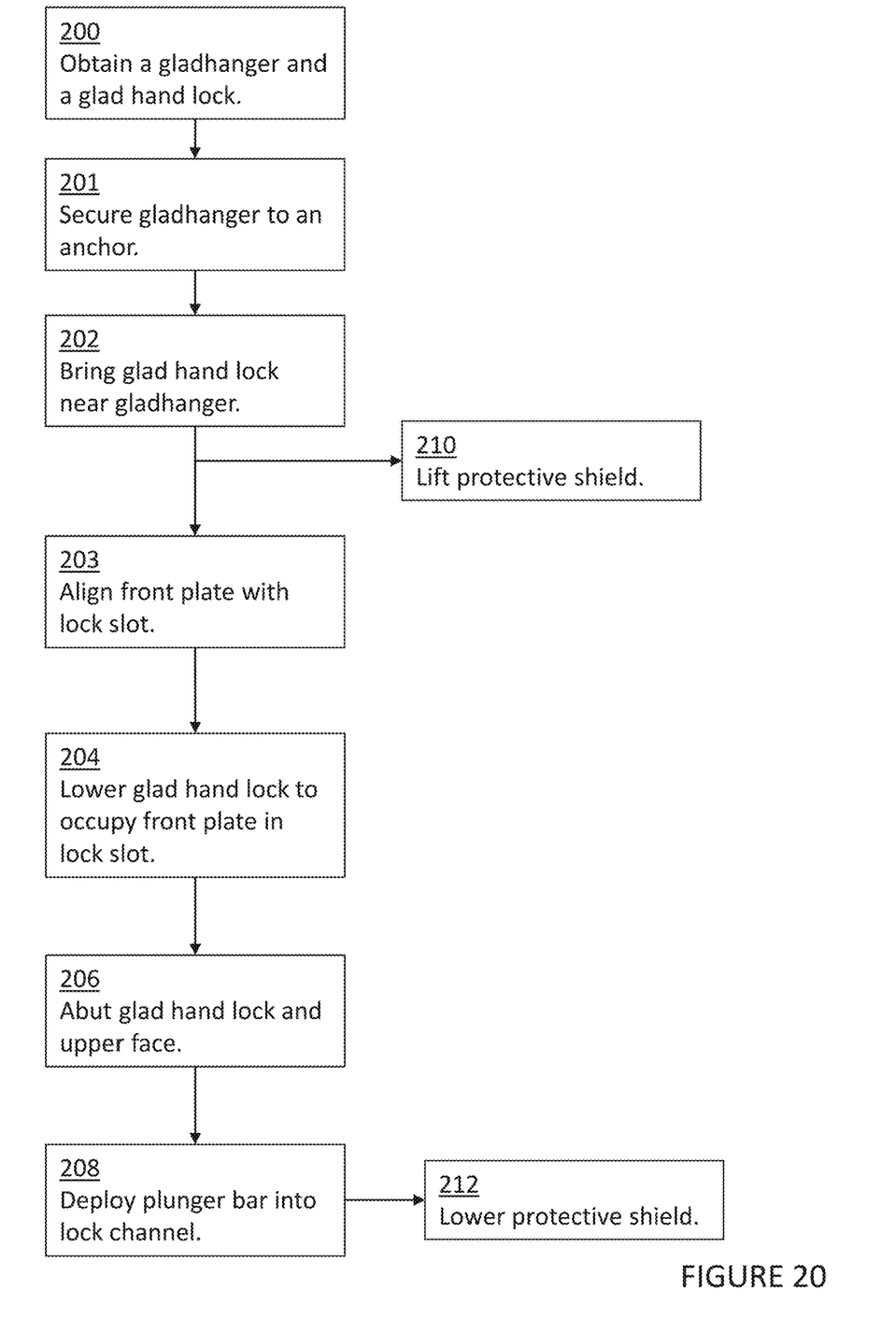
FIG. 20 depicts a flow diagram illustrating steps in using a gladhanger.

FIGS. 15-19 along with the flow chart of FIG. 20 illustrate the method of utilizing a gladhanger 100 for storage of a glad hand lock 60 during transition from a released configuration (released from a gladhanger) to a stored configuration (locked on a gladhanger). An initial step includes obtaining a gladhanger 100, 100B, 100C such as described herein and a gladhand (200). Securing the gladhanger to an anchor (201) such as illustrated in FIG. 15. Here a gladhanger 100 with a back plate 108 is secured through mounting holes to an anchor 104 utilizing one or more threaded fasteners 117. Other examples of anchors include a post/pole, a wall, a metal rail, or a dock under a dock door pad. A glad hand lock 60 is then brought near the gladhanger 100 (202) and the protective shield is lifted if present (210). The top end 126 of front plate 120 is then aligned with lock slot 72 (202) of glad hand lock 60 as illustrated in FIG. 16 and lowered (204) such that front plate 120 passes into lock slot 72 and first interior face 78 of the glad hand lock and upper face 130 of the gladhanger 100 abut as illustrated in FIG. 17 (206). As noted in FIG. 4, gladhanger 100 comprises a top end 126 that has a profile substantially defined by a width 'W', a thickness 'T', and a height 'H'. In preferred forms, W=1.625 inch with a range of +/−0.3 inch, T=0.625 with a range of +/−0.2 inch, and H=1.5 to 1.750 inch for passage through lock slot 72. In addition, lock gap 140, G=0.500 inch with a range of +/−0.2 inch in preferred forms. Although these represent preferred ranges, this disclosure is not limited to these values although embodiments in these ranges provide good fit that reduces theft of glad hand locks.

Figure 11:
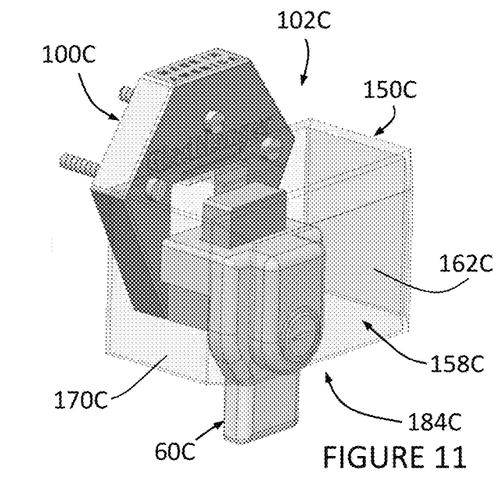
FIG. 11 depicts a front perspective view of a gladhanger with protective shield.
Figure 12:
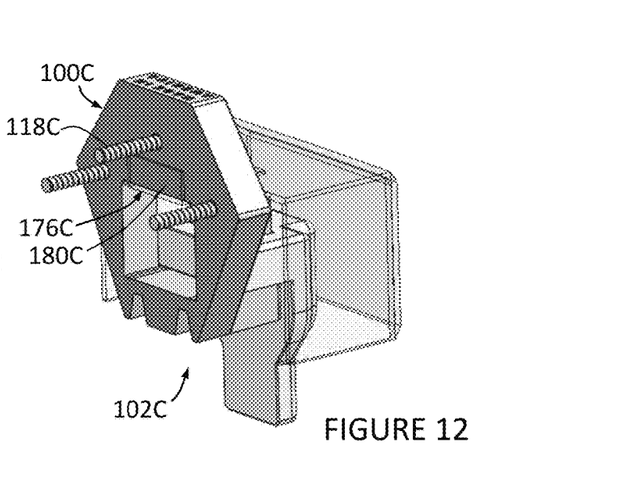
FIG. 12 depicts a rear perspective view of the gladhanger of FIG. 11.
Figure 13:
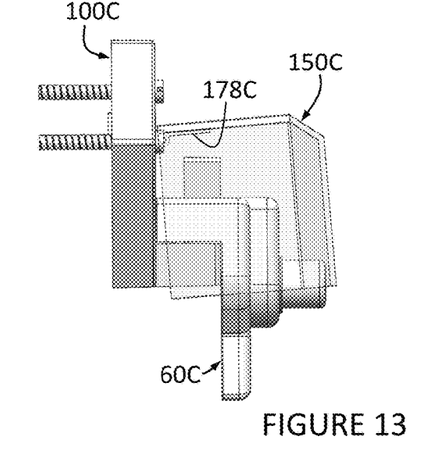
FIG. 13 depicts a side perspective view of the gladhanger of FIG. 11 with mounted glad hand lock, gladhanger unlocked, and protective shield partially closed.
Figure 14:
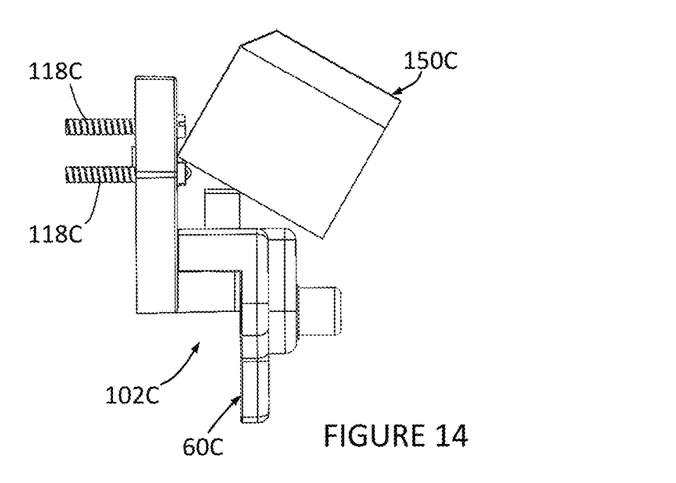
FIG. 14 depicts a side perspective view of the gladhanger of FIG. 11 with mounted gladhand lock and protective shield opened.

In a next step, plunger bar 84 is deployed into lock channel 138 (208) by a hand force on lock mechanism 88 and/or activation of a key 142 (FIG. 18). At this point, the glad hand lock 60 is secured in place on gladhanger 100 forming hanger lock assembly 102 on anchor 104. The protective shield can then be lowered if present (212). A reversal of these steps can be used to transition back from a stored configuration (locked on gladhanger), to a released configuration (released from gladhanger). Additional steps are utilized when the hanger lock assembly 102C includes a protective shield 150C. Mounting a glad hand lock 60C to a gladhanger 100C comprises lifting (pivoting) the protective shield 150C about the shield hinge 176C to provide open access to the front plate 120C as illustrated in FIG. 14. The protective shield is prevented from fully closing (FIG. 13) unless the lock mechanism of the glad hand lock is fully engaged in a storage configuration (FIGS. 11-12). This serves as a reminder to the user that the glad hand lock still needs to be locked on the gladhanger.

Figure 27:
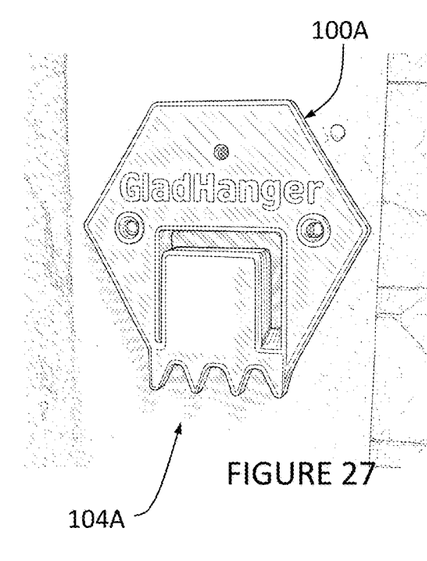
FIG. 27 depicts a front perspective view of a gladhanger mounted to a dock door.
Figure 28:
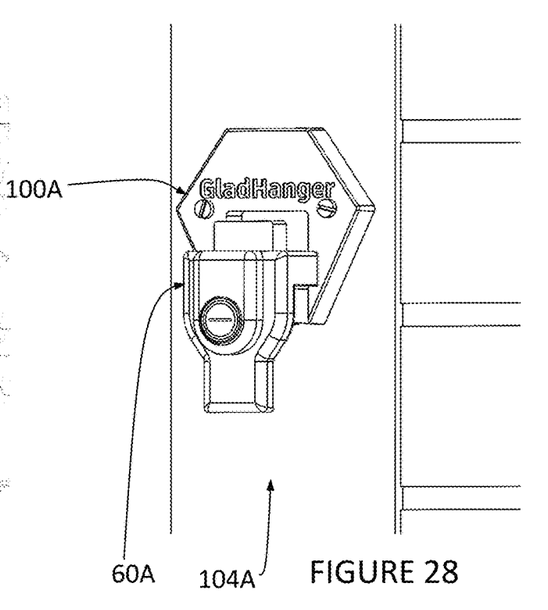
FIG. 28 depicts a front perspective view of the glad hand lock of FIG. 27 in a storage configuration on a gladhanger.
Figure 29:
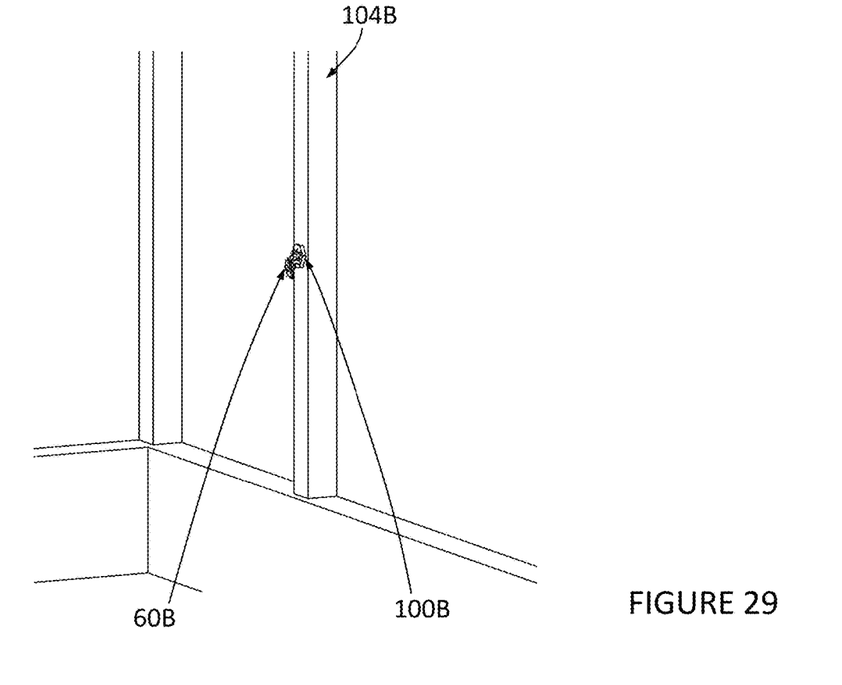
FIG. 29 depicts a side perspective view of a glad hand lock in a storage configuration on a gladhanger that is mounted to a post.

FIGS. 27-29 illustrate field use of the gladhanger. FIG. 27 illustrates a gladhanger 100B mounted with fasteners to an anchor 104B in the form of a steel rail on building. FIG. 28 illustrates a glad hand lock 60 in a storage configuration secured to gladhanger 100B using fasteners. FIG. 29 illustrates a glad hand lock 60 in a storage configuration mounted to a gladhanger 100B that is secured to an anchor 104B in the form of a pole.

It is noted that the terms "substantially" and "about" and "generally" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

The foregoing invention has been described in accordance with the relevant legal standards, thus the description is exemplary rather than limiting in nature. Variations and modifications to the disclosed embodiment may become apparent to those skilled in the art and fall within the scope of the invention.

The invention claimed is:

1. A bracket for secure storing of an inactive glad hand brake line locking device comprising:
    a back plate;
    said back plate having a rear face facing rearward formed thereon;
    said back plate having a front face opposed to said rear face facing frontal;
    a front plate;
    said front plate having a rear surface facing rearward and an opposed frontal surface on said front plate facing frontal;
    said rear surface spaced from and facing said front face defining a lock gap therebetween;
    a spacer arm;
    said spacer arm extending between said front plate and said back plate at one end of said back plate and said front plate;
    said lock gap open between said front plate and said back plate;
    said lock gap bounded by said spacer arm at said one end;
    said spacer arm comprising an upper face facing said lock gap;
    a bottom facing lower surface;
    a lock channel;
    entire said front plate sized to pass through a lock slot of a glad hand lock device;
    said lock channel and said upper face facing in opposite directions on opposing sides of said spacer arm; and,
    wherein said lock channel extends generally perpendicular from said frontal surface into said spacer arm.

2. The bracket of claim 1 further comprising:
    one or more mounting holes extending between said front face and said rear face operable to house a fastener.

3. The bracket of claim 1 further comprising:
    one or more frontal insets at said opposed side faces narrowing said front plate.

4. The bracket of claim 1 wherein said lock channel is substantially semi-cylindrical and at least partially opened.

5. The bracket of claim 1 further comprising:
    a window face;
    said window face extending between said rear face and said front face in said back plate;
    said window face defining a back plate window extending through said back plate rearward of said front plate;
    said back plate window being wider than said front plate; and,
    wherein said lock gap opens to said back plate window.

6. The bracket of claim 1 whereas said back plate is substantially hexagonal.

7. The bracket of claim 1 whereas said front face of said back plate comprises a logo.

8. The bracket of claim 1 further comprising:
    a top end of said front plate; and
    whereas said top end is configured for sliding fit into a lock slot of a glad hand lock.

9. The bracket of claim 1 further comprising:
    a protective shield coupled to said bracket.

10. The bracket of claim 9 whereas said protective shield is translucent.

11. The bracket of claim 9 further comprising:
    a shield hinge;
    whereas said shield hinge pivotably couples said protective shield to said back plate.

12. The bracket of claim 1 further comprising:
    a lock face on a bottom side of said front plate opposite said upper face.

13. The bracket of claim 1 further comprising:
    one or more downgrooves inset into said lower surface and extending from said front plate to said back plate.

14. The bracket of claim 1 whereas said lock gap ranges between 0.375 to 0.625 inches in length.

15. A method for secure storing of an inactive glad hand lock on a gladhanger comprising the steps of:
    obtaining a glad hand lock and a gladhanger, whereas said gladhanger comprises:
    a back plate;
    said back plate having a rear face facing rearward formed thereon;
    said back plate having a front face opposed to said rear face facing frontal;
    a front plate;
    said front plate having a rear surface facing rearward and an opposed frontal surface on said front plate facing frontal;
    said rear surface spaced from and facing said front face defining a lock gap therebetween;
    a spacer arm;
    said spacer arm extending between said front plate and said back plate at one end of said back plate and said front plate;
    said lock gap open between said front plate and said back plate;
    said lock gap bounded by said spacer arm at said one end;

said spacer arm comprising an upper face facing said lock gap and opposed by a lock face for seating a plunger bar of a glad hand lock against;
a bottom facing lower surface;
a lock channel;
said lock channel and said upper face facing in opposite directions on opposing sides of said spacer arm;
wherein said lock channel extends generally perpendicular from said frontal surface into said spacer arm; and,
said front plate having a top end configured for sliding fit into a lock slot of a glad hand lock;
securing the gladhanger to an immovable anchor;
aligning the top end of the front plate with a lock slot of the glad hand lock; and
lowering the glad hand lock such that the entire front plate extends through the lock slot.

16. The method of claim 15 further comprising the step of:
lifting a protective shield to provide access to the front plate.

17. The method of claim 16 further comprising the step of:
lowering the protective shield such that it rests against the back plate.

18. The method of claim 15 further comprising the step of:
abutting the glad hand lock and the upper face.

19. The method of claim 15 further comprising the step of:
deploying a plunger bar on the glad hand lock so that it is abutting the lock face on said spacer arm.

* * * * *